3,009,887
POLYMERIZATION PROCESS
Donald W. Kaiser, Hamden, Conn., assignor to Olin Mathieson Chemical Corporation, a corporation of Virginia
No Drawing. Filed Aug. 6, 1959, Ser. No. 831,952
7 Claims. (Cl. 260—2)

This invention relates to an improved process for the polymerization of alkylene oxides and particularly to the use of novel catalysts therefor.

Various catalysts have heretofore been proposed for polymerizing alkylene oxides, such as zinc diethyl with alumina, mixtures of aluminum and magnesium alkoxides, or of aluminum alkoxide with zinc chloride. Catalytic oxides or carbonates of calcium, strontium or zinc were used by Staudinger and Lohmann, Ann. 505, 41 (1933), in the polymerization of ethylene oxide to high molecular weight linear polymers.

The prior catalysts involve disadvantages with respect to ease of preparation at a desired reproducible activity or in being difficult to remove from the polymer or in other properties.

The main object of this invention has been to provide an improved process for the polymerization of alkylene oxides using an economical readily-prepared catalyst capable of promoting the desired polymerization. Another object has been to provide an improved catalytic process for copolymerizing alkylene oxides. Other objects will be apparent from the following detailed description.

In accordance with this invention, the polymerization or copolymerization of alkylene oxides is effectively promoted by incorporating in the reaction mixture a small proportion of a basic alkaline-earth phenoxide.

Suitable basic alkaline-earth phenoxide catalysts have been found to correspond to the general formula

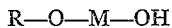

wherein M is an alkaline earth metal, particularly calcium, strontium and barium and R is an aryl group such as phenyl, naphthyl, or diphenyl. The aryl group may contain one or two halogen substituents, such as chlorine or bromine, with or without one or two alkyl or alkoxy substituents containing 1 to 10 carbon atoms each, preferably 1 to 4 carbon atoms.

The catalyst may in general be readily prepared by dispersing the phenolic compound in water or in an aqueous solution containing up to about half its weight of a water-miscible solvent such as dioxane or methyl ether of ethylene glycol and heating with a substantially equimolar amount of alkaline earth hydroxide, M(OH)$_2$, M being Ca, Sr or Ba. After digesting the agitated mixture at an elevated temperature, for example 75° to about 100° C., for 1 to 4 hours, the basic alkaline earth phenoxide is separated by filtration or by centrifuging, washed and dried.

Another method, particularly suitable for the preparation of catalytic basic alkaline-earth phenoxides from water-soluble phenols which are volatile with steam, involves reacting two moles of phenol with one mole of alkaline-earth hydroxide initially to form the phenoxide. The latter is then subjected to hydrolysis and steam distillation to form the basic phenoxide which may then be separated, washed and dried.

The catalyst may thus be prepared from phenol or other phenolic compounds, for example, o-, m-, or p-cresol or mixtures thereof; the individual xylenols or mixtures thereof; o- or p-ethyoxyphenol; o- or p-methoxyphenol; o-, m-, or p-butylphenol; o-, m-, or p-propoxyphenol; 2-methoxy, 4-isopropylphenol; 2-methyl, 4-isopropylphenol; 4-methyl, 2-isopropylphenol; o-, m-, or p-chlorophenol, alpha-naphthol; beta naphthol; p-propyl phenol; and p-propyl-o-cresol.

The alkylene oxides, or epoxides, which may readily be polymerized by the catalysts of this invention include ethylene oxide, propylene oxide, butylene oxide and aryl-substituted alkylene oxides, such as styrene oxide. Such alkylene oxides may be polymerized, or mixtures thereof copolymerized, to linear long-chain compounds characterized by high molecular weight, as indicated by values of intrinsic viscosity greater than about 0.8, and generally about 2 or greater.

The resulting polymers of ethylene oxide or copolymers consisting preponderantly of ethylene oxide units are soluble in water or greatly swollen by water and readily dispersed therein. They are useful as thickening and suspending agents in aqueous solutions, and as adhesives or binders. The polymers of the higher alkylene oxides, or copolymers consisting preponderantly of such units are similarly useful in organic solvent solutions, particularly in aromatic hydrocarbons and dimethylformamide. The high molecular weight polymers and copolymers of the alkylene oxides may be converted to sheeting or film or molded products.

The catalytic basic alkaline-earth phenoxide is generally used within the range of 2 to 5% by weight of the alkylene oxide although proportions as low as 0.2% by weight may at times be advantageous, smaller amounts being generally ineffective. Proportions higher than about about 5% may be harmful in causing too rapid reaction or resulting in polymers of undesirably low molecular weight.

Generally, the polymerization reaction may be effected in the absence of solvent or diluent, but better control of temperature and the rate of reaction, and greater uniformity of product result when an inert solvent or diluent, such as a cyclic hydrocarbon or aromatic hydrocarbon or chlorinated aromatic hydrocarbon, is used. The polymerization reaction is carried out preferably within a temperature range of 100° to 150° C. for at least about 10 hours.

The following specific examples are illustrative of the preparation of catalyst and use thereof in polymerizing alkylene oxides in accordance with this invention. In the examples, the stated parts and percentages are by weight.

*Example 1*

A mixture of 74 parts of calcium hydroxide, 188 parts of phenol, and 750 parts of water was stirred at 40° C. for 1 hour. The resulting turbid solution was filtered, yielding a clear filtrate. The filtrate was transferred to a flask equipped with a mechanical stirrer and set up for distillation. On heating, water and phenol were distilled and nearly colorless solid separated from the residual solution. As distillation was continued, additional water was added to the solution in the flask. Distillation was stopped after 8 hours, at which time, the condensate was clear, but possessed a faint phenol odor and still colored a ferric chloride solution. The granular, tan solid was filtered from the cooled mixture in the flask, and was washed with water, ethanol, and acetone. The dried product amounted to 91 parts, representing a 60.5% yield, and was found to have a neutral equivalent of 74.8, close to the theoretical value of 75 for

*Example 2*

A mixture of 100 parts of ethylene oxide and 2.5 parts of calcium basic phenoxide, prepared in accordance with Example 1, was charged into a 500 ml. rocking type autoclave. Polymerization was carried out at 110° C. for 18 hours. After cooling, 62 parts of a hard white polymer was obtained. The intrinsic viscosity in aqueous solution was 2.1.

*Example 3*

Into a 500 ml. rocking type autoclave, there was charged 100 parts of ethylene oxide, 3 parts of calcium basic phenoxide, and 163 parts of toluene. The mixture was rocked for 70 hours at 110° C. The product, after the removal of the toluene, was 100 parts of light tan polymer, which formed a slightly turbid, viscous aqueous solution, with intrinsic viscosity of 2.3.

*Example 4*

The charge was the same as in Example 3, except that 263 parts of benzene was employed in place of 163 parts of toluene. Polymerization was carried out during agitation for 25 hours at 110° C. After removal of the benzene, the product consisted of 69 parts of light tan polymer, displaying properties similar to those of the polymer of the above example.

*Example 5*

A rocking type autoclave was charged with 5 parts of calcium basic phenoxide, 163 parts of toluene, 50 parts of ethylene oxide, and 50 parts of propylene oxide. Polymerization was carried out during agitation for 20 hours at 140° C. After removal of the toluene, 67 parts of copolymer were obtained in the form of a light tan gum. The copolymer was insoluble in water and soluble in aromatic hydrocarbons and dimethylformamide, yielding highly viscous solutions.

*Example 6*

A rocking type autoclave was charged with 5 parts of calcium basic phenoxide and 100 parts of propylene oxide. Polymerization was carried out for 119 hours at 110° C. The resulting polymer consisted of 26 parts of a light tan, tacky gum. The polymer was insoluble in water, but yielded viscous solutions in benzene and toluene.

*Example 7*

A mixture of 5 parts of calcium basic phenoxide, 86 parts of toluene, and 100 parts of propylene oxide was charged into a rocking type autoclave. Rocking and heating were carried out for 67 hours at 140° C. After cooling, the turbid solution was filtered and the separated solid was dried. The polymer amounted to 39 parts and was similar to the product of Example 6.

*Example 8*

Into a 300 ml. stirring type autoclave, there was charged 2.5 parts of calcium basic phenoxide, 50 parts of ethylene oxide, and 77 parts of cyclohexane. Polymerization was carried out during agitation for 22 hours at 110° C. After removal of the cyclohexane by drying, 50 parts of a white, crumbly polymer were obtained. The intrinsic viscosity in aqueous solution was 2.2.

*Example 9*

A stirring type autoclave was charged with 2.5 parts of calcium basic phenoxide, 64 parts of petroleum ether, B.P. 30°–60° C., and 50 parts of ethylene oxide. Polymerization was carried out during agitation at 110° C. for 70 hours. The dried product amounted to 50 parts of a slightly gray, hard polymer, which dissolved in water to yield a stringy and viscous solution.

*Example 10*

An autoclave, equipped with stirrer, was charged with 50 parts of ethylene oxide, 77 parts of cyclohexane, and 2.5 parts of calcium basic phenoxide. The mixture was stirred at 110° C. for 18 hours. After removal of the solvent, 40 parts of light gray polymer was obtained. The polymer displayed an intrinsic viscosity of 2.0 in aqueous solution.

In the above examples, effective polymerization is likewise obtainable with the substitution of all or part of the calcium basic phenoxide catalyst by strontium or barium basic phenoxide. It is also to be understood that the basic phenoxide catalyst may be formed from other phenolic compounds, as described above.

As other modifications may be made in the above specific embodiments, which will be apparent to those skilled in the art, they are to be understood to be within the spirit and scope of the present invention as defined by the following claims.

What is claimed is:

1. The process of polymerizing an alkylene oxide comprising heating said oxide substantially in the absence of other compounds reactive therewith and in the presence of a catalytic amount of a basic alkaline-earth phenoxide corresponding to the formula R—O—M—OH, wherein R is an aryl radical selected from the group consisting of phenyl, naphthyl and diphenyl, and M is an alkaline-earth metal selected from the group consisting of calcium, strontium and barium at a temperature of about 100° to 150° C. thereby forming a high molecular weight linear polymer of said oxide characterized by an intrinsic viscosity greater than about 0.8, and separating said polymer.

2. The process of polymerizing an alkylene oxide comprising heating said oxide substantially in the absence of other compounds reactive therewith and in the presence of about 2 to 5% of its weight of a basic alkaline-earth phenoxide corresponding to the formula R—O—M—OH, wherein R is an aryl radical selected from the group consisting of phenyl, naphthyl and diphenyl, and M is an alkaline-earth metal selected from the group consisting of calcium, strontium and barium at a temperature of about 100° to 150° C. thereby forming a high molecular weight linear polymer of said oxide characterized by an intrinsic viscosity greater than about 0.8, and separating said polymer.

3. The process of polymerizing an alkylene oxide comprising heating said oxide substantially in the absence of other compounds reactive therewith and in the presence of about 2 to 5% of its weight of a basic alkaline-earth phenoxide corresponding to the formula R—O—M—OH, wherein R is an aryl radical selected from the group consisting of phenyl, naphthyl and diphenyl, and M is an alkaline-earth metal selected from the group consisting of calcium, strontium and barium and of an inert liquid hydrocarbon at a temperature of about 100° to 150° C. thereby forming a high molecular weight linear polymer of said oxide characterized by an intrinsic viscosity greater than about 0.8, and separating said polymer.

4. The process in accordance with claim 1, wherein said alkylene oxide consists of ethylene oxide.

5. The process in accordance with claim 1, wherein said alkylene oxide consists of ethylene oxide and propylene oxide.

6. The process in accordance with claim 1, wherein said basic alkaline-earth phenoxide consists of calcium basic phenoxide corresponding to the formula $$C_6H_5\text{—O—Ca—OH}$$

7. The process in accordance with claim 1, wherein said basic alkaline-earth phenoxide is formed from a phenol having an aryl radical containing a substituent chosen from the group consisting of alkyl, alkoxy and halogen.

References Cited in the file of this patent

FOREIGN PATENTS 220,517    Australia _____ Feb. 19, 1959

OTHER REFERENCES

International Union of Pure and Applied Chemistry, "Nomenclature of Organic Chemistry," p. 22, Butterworth's Scientific Publications, London, 1958.